United States Patent [19]
Johann et al.

[11] Patent Number: 5,184,343
[45] Date of Patent: Feb. 2, 1993

[54] COMPENSATION FOR DUST ON AN OPTICAL DISK BY INCREASING LASER WRITING POWER

[76] Inventors: Donald F. Johann, 3724 Carlson Cir., Palo Alto, Calif. 94306; Alan C. Burroughs, 851 Arnold Way, San Jose, Calif. 95128

[21] Appl. No.: 696,230

[22] Filed: May 6, 1991

[51] Int. Cl.$^5$ .............................................. G11B 7/00
[52] U.S. Cl. ...................................... 369/116; 369/54
[58] Field of Search ...................... 369/100, 13, 44.32, 369/44.35, 44.36, 54, 58, 116, 121, 44.31, 44.26; 250/205

[56] References Cited
U.S. PATENT DOCUMENTS
4,941,139  7/1990  Kulakowski et al. ................. 369/54

FOREIGN PATENT DOCUMENTS
58-14333  1/1983  Japan ................................... 369/116

Primary Examiner—Constantine Hannaher
Assistant Examiner—Jim Beyer

[57] ABSTRACT

An apparatus and method for compensating for dust particles on the surface of an optical disk during a write operation includes a circuit for sensing the reflected laser light back from the optical storage medium, and a negative peak detection circuit for determining when the reflected laser light drops below the average read power level. The reflected laser power is reduced below the average read level whenever a dust or dirt particle is blocking a portion of the incoming laser light. An additonal circuit means then increases the power of the laser beam by an amount proportional to the detected reduction so that the data can be effectively recorded.

17 Claims, 3 Drawing Sheets

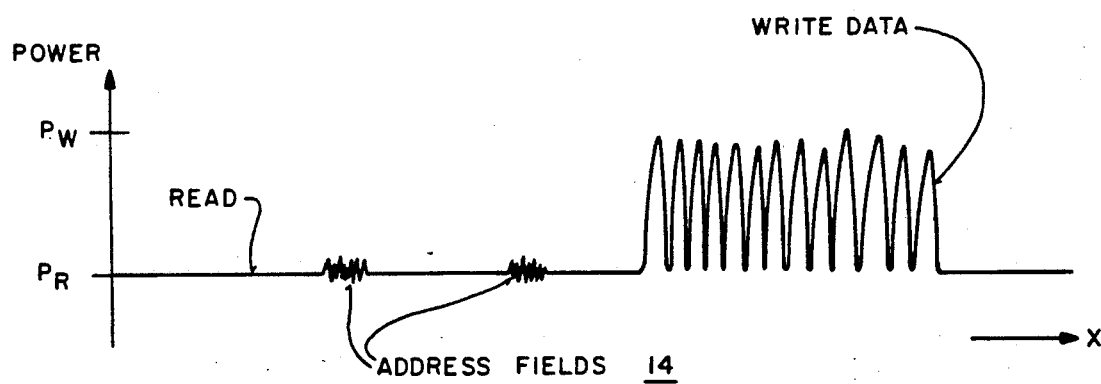
FIG_1
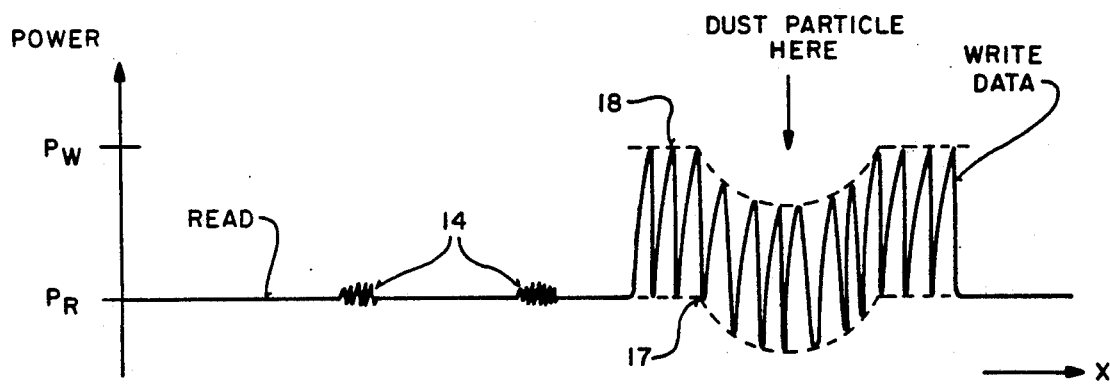
FIG_2

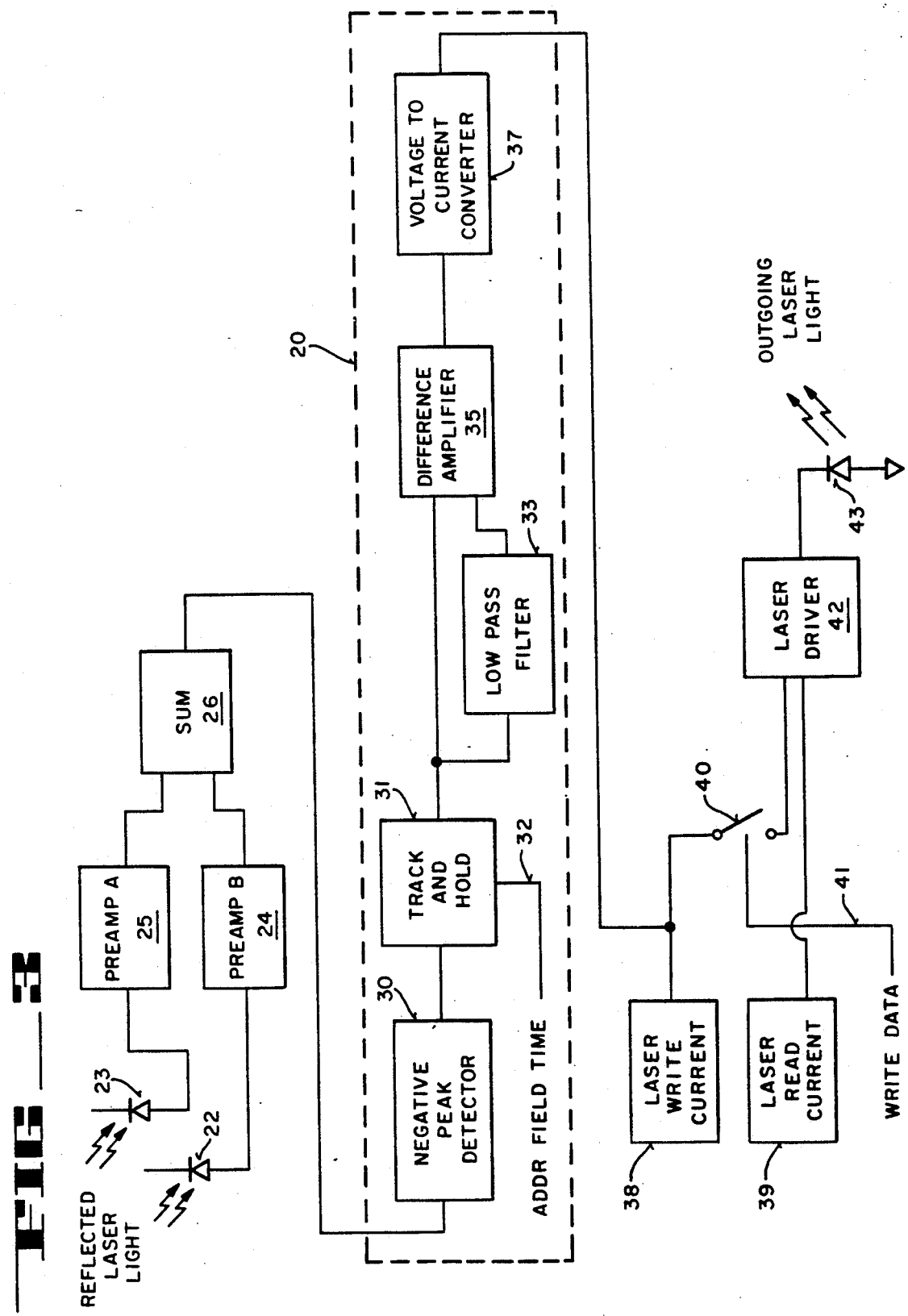
FIG—3

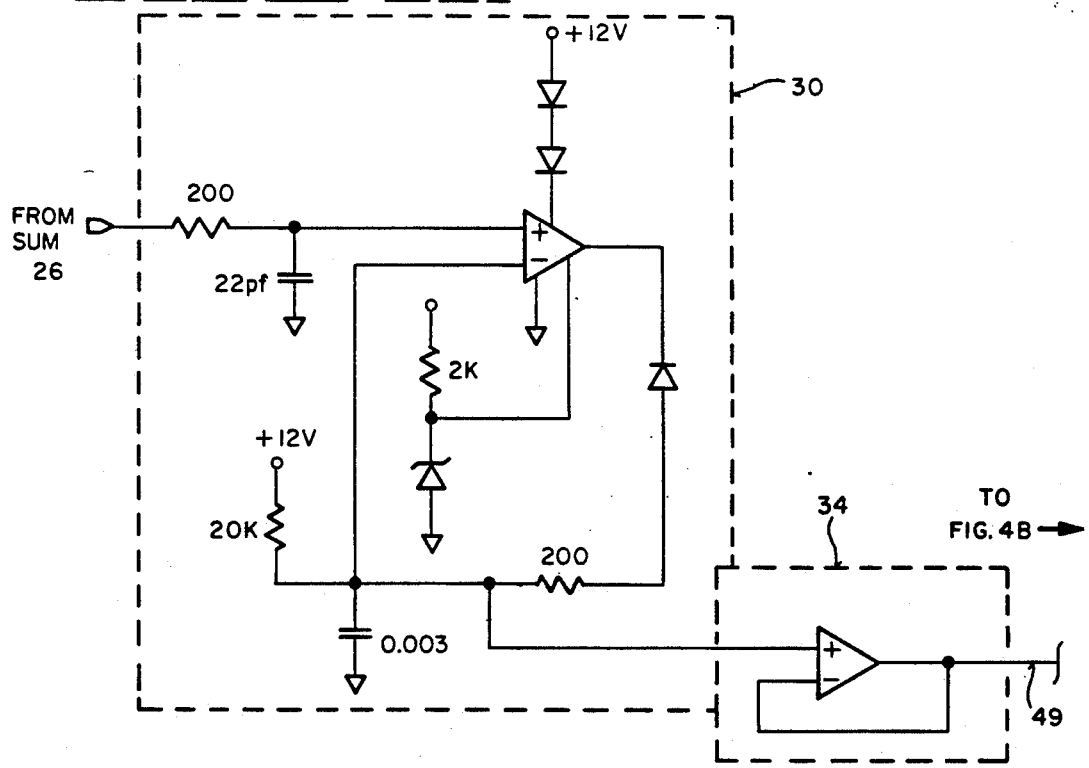
FIG_4A
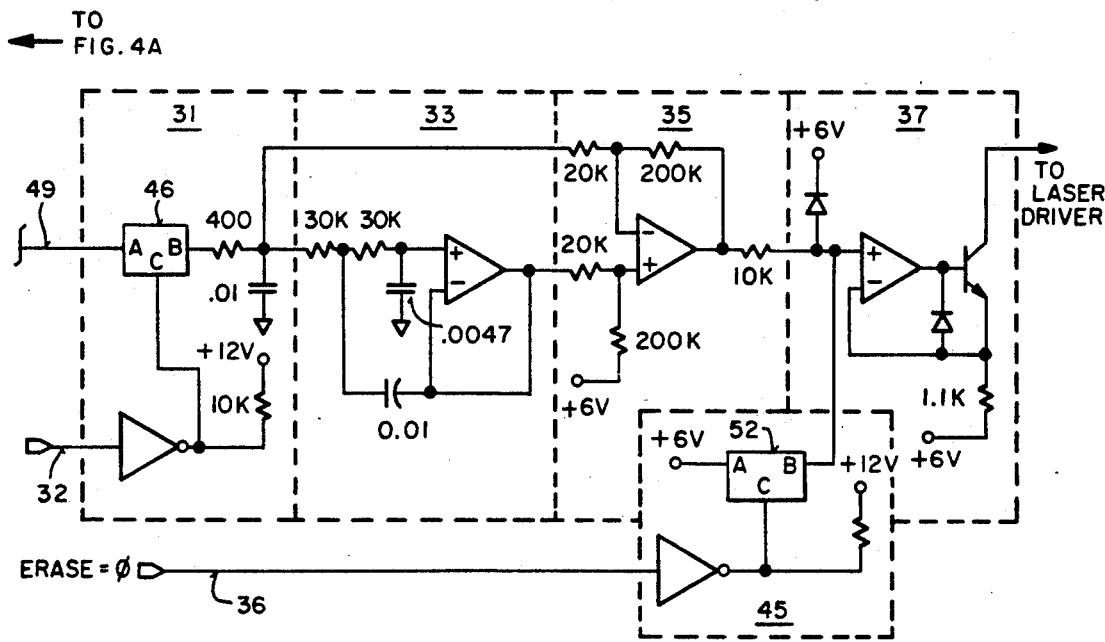
FIG_4B

COMPENSATION FOR DUST ON AN OPTICAL DISK BY INCREASING LASER WRITING POWER

FIELD OF THE INVENTION

The present invention relates to the field of optical recording systems; specifically, to circuits and methods which compensate for the presence of unwanted contaminate matter on the surface of the optical disk drive storage medium.

BACKGROUND OF THE INVENTION

Optical and magnetooptical data storage systems combine very high storage density with low cost, random access, and erasability. The commercial success of these systems has led to a technological push to further increase the areal density, data rates, access times and the erasability of these types of drives.

The basic principles of magnetooptical recording involves pulsing a focused laser beam to a high power for a short period of time in order to raise the temperature of a perpendicularly magnetized medium. The temperature of the magnetized medium is elevated for a sufficiently long time such that an externally applied magnetic field can be used to reverse the direction of magnetization in the heated region. When the laser power is reduced, the active layer of the optical medium cools to a lower temperature. At a reduced temperature, the region of reversed magnetization persists.

To read the medium, the same laser beam is employed to sense the orientation of the magnetized regions previously encoded. Information is then read from the optical disk in conformance with the optical Kerr effect. According to the optical Kerr effect, light reflected off the surface of the magnetic material is optically polarized. The polarization angle of the electromagnetic radiation reflected from the surface of the magnetic material is a function of its magnetization. This polarization is the result of the interaction between the photons and the molecular order imposed by the magnetizing field. The stronger the magnetic field the greater the molecular ordering, and the more that the ordering influences the incident radiation.

Optical recording systems take advantage of the polar Kerr effect during read-out of information by sensing in which direction the linearly polarized light reflected from a perpendicularly magnetized medium will be rotated (e.g., to the left or right according to the direction of magnetization). Thus, by simply checking the direction of the plane of polarization of a reflected light, information can be read using the same laser that was utilized to write the information to the medium. (It is important to note that reading has no influence on the state of magnetization since the read laser power is relatively low. Hence, read-out produces an insufficient temperature rise to alter the direction of magnetization within the optical medium).

One of the problems that arises in optical disk drive systems is the presence of contaminated particles or defects on the surface of the optical disk. Investigation into the effect of dust and dirt particles on the surface of the optical disk indicates that the most serious impact is on the write process. The read-back process has been demonstrated to be relatively immune to this phenomena.

The crux of the problem lies in the fact that a dust particle is capable of blocking a portion of the incoming laser light during write operations. This light, as previously discussed, is used to raise the temperature of the magetized medium. However, in blocking a portion of the incoming light the dust particle effectively reduces the available write power being delivered to the magnetizing layer at the very point where the data is to be recorded. If the write power drops below a certain threshold level, the underlying perpendicularly magnetized medium fails to reach a high enough temperature capable of reversing the direction of magnetization.

The ramification, of course, is that the dust particle (or other contaminate particle) prevents the data from being properly recorded. In this respect it has been observed that even a very small dust particle on the disk surface can adversely affect data integrity over an area of more than five times the diameter of the particle itself. As a consequence, uncorrectable errors are caused, even in disk drive systems incorporating extensive ECC correctional capabilities.

What is needed then is a way to compensate for the reduction in power at the active surface of the medium due to the presence of a dust particle on the surface of the disk. As will be seen, the present invention discloses a novel circuit which is capable of detecting the presence of a contaminate particle on the optical disk drive's surface. The invention then increases the write power of the laser over the area of the disk where the contaminate particle is blocking the incoming laser light. The increase in laser power is made to be proportional to the reduction sensed. The additional laser power overcomes the loss of light phenomena. Consequently, drive systems incorporating the present invention are capable of writing data reliably—even in the presence of very large (i.e., up to 0.5 millimeters) dust particles.

SUMMARY OF THE INVENTION

The present invention discloses an apparatus and method for compensating for the influence of dust particles on the surface of an optical disk during a write operation.

Most optical disk drive systems are very sensitive to dust or dirt which settles on the surface of the optical storage medium. The most serious repercussion of dust on the disk is on the write process, wherein a portion of the incoming laser light is blocked by the dust or dirt particle. The net effect is that the dust particle effectively reduces the available write power delivered to the active magnetic layer. This reduction takes place at the very location where the data is to be recorded. If the write power drops below a certain threshold level, then the data is not recorded.

The present invention is capable of sensing when the available power at the active layer of the disk is being reduced. The invented apparatus then compensates for any reduction by boosting the write laser power to compensate for the light-blocking properties of the particle. In the end, the data is written to the disk as if the dust particle was not there.

In one embodiment, the invented apparatus comprises a means for sensing the reflected laser light back from the optical storage medium. A negative detection means is then employed to detect when the negative peaks of the reflected laser light drop below the average read power level. The reflected laser power is reduced below the average read level whenever a dust or dirt particle is blocking a portion of the incoming laser light.

Once a reduction in laser light has been detected in this manner, a circuit means increases the power of the laser beam by an amount proportional to the detected reduction. The increase in laser power is sufficient to overcome the light-blocking effect of the dust particle so that the data can be effectively recorded.

The reliability of the present invention has been demonstrated with dust particles up to 0.5 millimeters wide. (For particles greater than 0.5 millimeters, the wavefront quality of the laser light becomes so degraded that it is impossible to write data to the medium despite further increases in laser power.)

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a graphical representation of the reflected laser light received during read and write operations.

FIG. 2 illustrates the influence of a dust or other contaminate particle on the signal waveform of FIG. 1.

FIG. 3 is a circuit block diagram of the write compensation circuit of the present invention.

FIGS. 4A & 4B illustrate the currently preferred embodiment of the present invention.

DESCRIPTION OF THE PREFERRED EMBODIMENT(S)

An apparatus for compensating the write signal in an optical disk drive is described. The invented apparatus overcomes the reduction in light energy which normally results from the presence of a contaminate particle on the surface of the optical storage medium. In the following description, numerous specific details are set forth, such as specific circuit structures, dimensions, configurations, etc., in order to provide a thorough understanding of the present invention. It will be obvious, however, to one skilled in the art that these specific details may not be needed to practice the present invention. In other instances, well known structures and circuits have not been shown in detail in order to avoid unnecessarily obscuring the present invention.

It is well known in the art that contaminate particles (such as dust) on the surface of an optical storage disk will interfere with the writing of data to the underlying active layer of the disk medium. Basically, a particle of dust will cause the amount of power that strikes the active surface of the medium to be attenuated in proportion with the size of the dust particle. By way of example, a dust particle which obstructs 20% of the incoming laser light will reduce the write power by a corresponding amount (e.g., 20%). Thus, a contaminate particle on the disk surface can prevent the underlying magnetooptical material from absorbing enough laser energy so that the data is never effectively recorded.

This phenomena is illustrated in FIGS. 1 and 2, which show signal waveforms with and without the presence of a dust particle which interferes with the write process. FIG. 1 illustrates a normal write operation wherein the electrical signal shown is developed off of the laser light reflected from the optical disk. The power of the reflected read signal is observed to be a constant read value $P_R$. This read value represents a relatively low power level which provides a stable reference, as will be discussed in more detail shortly.

During a write operation, the laser is constantly pulsed from its normal read level to a higher energy state during the writing of each bit. This higher energy state is indicated generally in FIGS. 1 and 2 by power level $P_W$. Between bits the laser energy returns to its normal read level energy state $P_R$. As explained earlier, this higher energy state raises the temperature of the magnetooptical disk in the area where data is to be recorded. When the temperature in this fashion, an externally applied magnetic field can be used to reverse the polarity of magnetization of the active layer of the optical storage medium. Meanwhile, the normal read power level is intentionally made low enough so that the polarity of the magnetized layer is unchanged during reading. (Note that preformatted address fields 14 precede the written data for the sector shown in both of FIGS. 1 and 2.)

In FIG. 2, a dust particle is introduced onto the surface of the optical medium in the area over which data is to be recorded. The impact of the dust particle is to produce a "dip" in the write data waveform. This dip is shown in FIG. 2 by the dashed envelope region. The upper boundary of the envelope region is shown by dashed line 18, while the lower boundary of the envelope is indicated by dashed line 17. In other words, the entire write data waveform is effectively depressed as a result of the presence of the dust particle. In this depression region the positive peaks of the write data waveform drop below the normal write power level $P_W$. At the same time, negative peaks of the write data waveform drop below the normal read power level $P_R$. Practitioners in the art will appreciate that, if the power received by the active layer of the disk drops below a certain threshold, data will no longer be recorded.

FIG. 3 illustrates a block diagram of the write compensation circuit 20 of the present invention. Basically, compensation circuit 20 examines the reflected laser light from the optical disk and detects whether that light has been reduced by the presence of a dust particle (or by some defect, such as a scratch, on the surface of the disk). If the circuit detects that the light has been obstructed by a dust particle, for example, it responds by increasing the laser power proportionately to compensate for the loss of light.

With continuing reference to FIG. 3, the various blocks outside of circuit 20 represent conventional elements of an optical disk drive system. These elements include photodiode detectors 22 and 23 which sense the reflected laser light from the disk surface. Each of photodiodes 22 and 23 convert the reflected light energy into an electrical signal that is amplified by preamplifiers 24 and 25, respectively. The amplified signals are then summed together by summing circuit 26. The output of summer 26 represents the normal preformatted data signal of the drive system. This preformatted data signal provides a measure of the power level associated with the reflected laser light from the disk.

The output of summer 26 is coupled to the input of negative peak detector 30. The purpose of negative peak detector 30 is to follow the most negative extremes of the preformatted data signal. Ordinarily, the negative peaks occur at about the same power as the read level. However, in the presence of a dust particle the negative peaks drop below the average read level of the system. Thus, negative peak detector 30 is designed to track or register the drop in read power resulting from the presence of a dust particle on the surface of the optical medium.

The output of negative peak detector 30 is shown coupled to the input of track and hold circuit 31. Track and hold circuit 31 is designed to remove the effects of the preformatted address fields 14 (see FIGS. 1 and 2). The output of track and hold circuit 31 provides a continuous representation of the read level of the reflected laser light from the disk. Whether the drive is reading or writing—since the write pulse always returns to the read level—the output of track and hold circuit 31 outputs the current or instantaneous read level of the light.

As shown in FIG. 3, circuit 31 also receives an additional address field time input along line 32. Line 32 effectively functions as the "hold" line for block 31. When line 32 is activated, the present value of the output of peak detector 30 is held until line 32 is again disactivated. Line 32 is only activated during address fields 14. Operated in this way, track and hold circuit 31 filters out the influence of address data fields 14 on the instantaneous read level. This also ensures that the address field information does not corrupt the average read level signal, as is further discussed below.

The output of track and hold circuit 31 is coupled to one input of difference amplifier 35 and also to the input of low pass filter 33. Low pass filter 33 filters the instantaneous read level signal output by block 31 to provide an indication of the average read level of the laser light reflected back from the disk over a period of several sectors. Thus, the purpose of filter 33 is to remove the effects of an defect or dust particle on the surface of the disk. In other words, the output of low pass filter 33 represents what the negative peaks of the laser light waveform should be in the absence of a dust particle, i.e., the normal read power level $P_R$. Recognize that low pass filter 33 outputs the average read level of the reflected light whether or not the drive was writing or reading during the previous sectors. It should be apparent that the droop depicted in FIG. 2 by dashed lines 17 and 18 does not affect the output of filter 33.

Difference amplifier 35 compares the instantaneous read power output by track and hold circuit 31 to the average or reference read level supplied by low pass filter 33. If a defect or dust particle is present on a disk, there will be a corresponding reduction in the instantaneous read power level but the average read level will be unaffected. This means that a difference voltage appears at the input of amplifier 35 whenever a contaminate particle or other defect blocks a portion of the incoming laser light. The instantaneous circuit (i.e., negative peak detector 30) picks up the lower dip in read power, as shown by dashed line 17 in FIG. 2. At the same time, this dip is ignored by low pass filter 33 since it does not is designed to take a long-term average of the read power over many sectors. Hence, the magnitude of the voltage difference at the input of amplifier 35 is proportional to the amount of light which has been obstructed. Amplifier 35 produces a voltage which corresponds to this difference.

Normally, the output of difference amplifier 35 is zero since the instantaneous reflected light is the same as the average reflected light. In other words, the negative peaks detected during a write operation fall on the same line as the average read level $P_R$, as is shown in FIG. 1. However, when a dust particle is present on the disk, the instantaneous reflected light drops while the average read level remains the same. The output of a difference amplifier 35 is proportional to how much light was lost due to the dust particle.

Voltage-to-current converter 37 scales the error signal output by amplifier 35 and converts that signal to a current. This current is then summed with the normal write current generated by block 38. The summed current is applied to laser driver 42 through switch 40. Write data is introduced along line 41. Laser read current is provided to driver 42 from block 39.

As shown in FIG. 3, laser drive 42 drives photodiode 43 which generates the laser light directed onto the surface of the optical storage disk. Thus, the additional current supplied by circuit 20, compensates for the effect of the dust particle. The light output of laser diode 43 is increased in direct proportion to the amount of light lost due to a defect or dust particle.

The currently preferred embodiment of the present invention is shown in the circuit schematic diagrams of FIGS. 4A and 4B. FIG. 4A shows negative peak detector circuit 30 comprising an operational amplifier in a feedback configuration. Negative peak detector circuit 30 drives a simple buffer circuit 34 which is coupled to track and hold circuit 31 along line 49. Circuit 31 includes a switching element 46 which is controlled by the output of an inverter which receives its input along line 32. Low pass filter 33 comprises a two-pole active filter having a cut-off frequency at approximately 100 hertz.

Difference amplifier 35 comprises a high gain operational amplifier which drives voltage-to-current converter 37. Also shown in FIG. 4B is a circuit block 45 which includes an ordinary switching device 52 for disabling circuit 20 during erase operations. Circuit block 45 is controlled by line 36. The detailed operation of the circuit of FIGS. 4A and 4B will be appreciated by ordinary practitioners working in the field of optical disk drives.

Whereas many alternations and modifications to the present invention will no doubt become apparent to a person having ordinary skill in the art after having read the foregoing description, it it to be understood that the particular embodiments shown and described by way of illustration are in no way intended to be considered limiting. For example, although this disclosure has shown the use of a low pass filter for developing a representation of the average read level signal, other methods of generating a signal are also possible. One alternative to lowpass filtering is to sample the received signal in the previous sector. Moreover, a positive rather than a negative, peak detector could be employed for the purpose of providing a measure of the instantaneous read level of the reflected light. Still, other embodiments may avoid using track and hold circuitry altogether and either tolerate the disturbance to the average read level or utilize additional filtering means. Therefore, reference to the details of the illustrated circuits are not intended to limit the scope of the claims which themselves recite only those features essential to the invention.

We claim:

1. In a system employing a focussed laser beam to record information on an optical storage medium, an apparatus which compensates for the presence of a contaminate particle or defect on the surface of said medium during the writing of data, said apparatus comprising:

means for sensing the reflected laser light back from said medium;

means for detecting, during a write operation, that the power of said reflected laser light has been reduced due to the presence of said particle or defect on said surface, said detection means including a means for generating a representation of the average read power level of said reflected light, and a means for comparing the instantaneous read power level with said average read power level of said reflected light, the difference being proportional to the reduction in reflected laser power due to said particle or defect; and means for increasing the power of said laser beam by an amount sufficient to overcome the light power reduction effects of said particle or defect such that said data is effectively recorded on said medium.

2. The apparatus of claim 1 wherein the size of said dust particle is in the range 0.1 to 0.5 millimeters wide.

3. The apparatus of claim 1 wherein said increasing means comprises:
means for converting said difference to a current; and
means for adding said current to the laser write current which drives said laser beam during said write operation.

4. The apparatus of claim 3 further comprising:
a means for disabling said detection means whenever said laser beam scans the preformatted address information field associated with a section of said medium.

5. The apparatus of claim 4 further comprising a means for disabling said apparatus during an erase operation.

6. In a magnetooptical disk drive system utilizing a laser driven to a high power level to write information to an optical storage medium, said laser being driven to a read power level significantly lower than said high power level for reading information from said medium, an apparatus which compensates for the presence of a contaminate particle on the surface of said medium during a write operation comprising:
sensing circuit means for sensing the reflected laser light from said medium and converting it to an electrical signal;
detection circuit means for detecting the negative peaks of said signal, said negative peaks corresponding to the instantaneous read level of said laser;
low pass filtering means for filtering said instantaneous read level to generate an average read level for said signal;
comparator means for comparing said instantaneous read level with said average read level, said comparator means producing an error signal which is proportional to the reduction of reflected laser power due to said contaminate particle;
means for increasing said high power level, said means utilizing said error signal to generate additional laser power which compensates for said reduction.

7. The apparatus of claim 6 wherein the size of said contaminate particle is approximately 0.1 to 0.5 millimeters wide.

8. The apparatus of claim 6 wherein said increasing means comprises a means for converting said error signal to a current which is then summed with the laser write current driving said laser during said write operation.

9. The apparatus of claim 8 further comprising a means for disabling said detection means whenever said laser scans the preformatted address field information associated with a sector of said medium.

10. The apparatus of claim 9 wherein said low pass filter means comprises an active low pass filter circuit that samples said instantaneous read level over several sectors.

11. The apparatus of claim 10 further comprising a means for disabling said apparatus during an erase operation.

12. An optical disk drive system utilizing a laser driven to a relatively high power level for writing information to the active layer of an optical disk, said laser being driven to a lower power level during reading of said information, said system further including an apparatus which compensates for the presence of a contaminate particle on the surface of said medium during a write operation, said contaminate particle effectively blocking a portion of the incoming laser light to reduce the available write power at the point where said information is to be recorded, said apparatus comprising:
sensing circuit means for sensing the reflected laser light from said disk and converting it to an electrical signal, said sensing circuit means comprising a pair of photodiode detectors for differentially deriving said signal;
detection circuit means for detecting the negative peak levels of said signal, the output of said detection circuit means corresponding to the instantaneous read level of said signal;
track and hold circuit means for removing the effects of preformatted address fields on said output of said detection circuit means, thereby providing a representation of the read level of said reflective light from said disk;
low pass circuit for filtering said representation to provide an indication of the average read level of said reflected light over a period of at least one sector of said disk;
a differential amplifier means for comparing said representation with said average read level, said amplifier means producing a voltage which is proportional to the amount of light lost due to said contaminate particle;
voltage-to-current converter means for converting said voltage to a current that can be summed with the normal write current driving said laser diode, thereby compensating the light output of said laser diode for the presence of said contaminate particle.

13. The apparatus of claim 12 wherein the size of said contaminate particle is approximately 0.1 to 0.5 millimeters wide.

14. The apparatus of claim 12 wherein said low pass filter means comprises an active low pass filter circuit that samples said representation over a plurality of sectors.

15. The apparatus of claim 14 further comprising a means for disabling said apparatus during an erase operation.

16. In a system employing a focussed laser beam to record information on an optical storage medium, a method for compensating for the presence of a contaminate particle or defect on the surface of said medium during the writing of data comprising the steps of:
sensing the reflected laser light from said medium;
detecting that the power of said reflected laser light has been reduced during a write operation due to the presence of said particle or defect on said surface by generating a representation of the average read power level of said reflected light, and comparing the instantaneous read power level with said average read power level of said reflected light, the difference being proportional to the reduction in reflected laser power due to said particle or defect; and boosting the power of said laser beam by an amount sufficient to overcome the light power reduction effects of said particle or defect such that said data is effectively recorded on said medium.

17. The method of claim 16 wherein the size of said particle or defect is in the range 0.1 to 0.5 millimeters wide.

* * * * *